E. SCHNEIDER.
CONSTRUCTION OF BOGIES.
APPLICATION FILED MAR. 31, 1919.

1,331,128. Patented Feb. 17, 1920.
3 SHEETS—SHEET 1.

Inventor
Eugene Schneider
by Mauro, Cameron, Lewis & Massie
Attys.

E. SCHNEIDER.
CONSTRUCTION OF BOGIES.
APPLICATION FILED MAR. 31, 1919.

1,331,128.

Patented Feb. 17, 1920.
3 SHEETS—SHEET 2.

E. SCHNEIDER.
CONSTRUCTION OF BOGIES.
APPLICATION FILED MAR. 31, 1919.
1,331,128.
Patented Feb. 17, 1920.
3 SHEETS—SHEET 3.
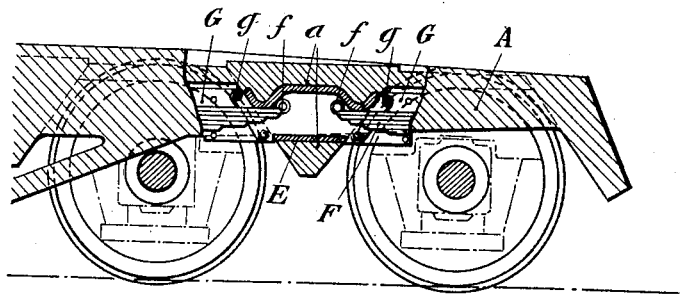
Fig. 5.a
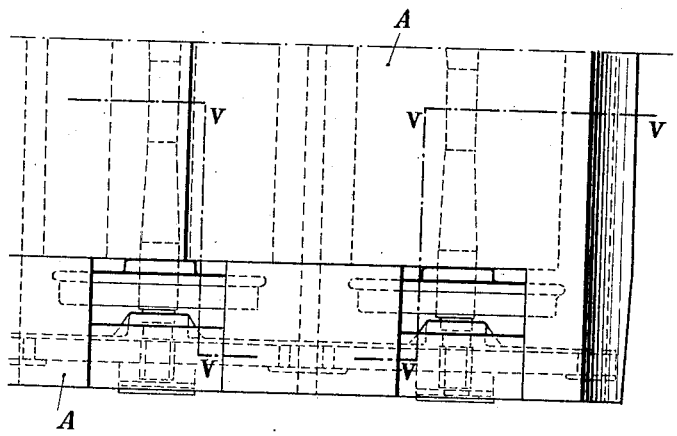
Fig. 6.a

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

CONSTRUCTION OF BOGIES.

1,331,128.  Specification of Letters Patent.  Patented Feb. 17, 1920.

Application filed March 31, 1919. Serial No. 286,499.

*To all whom it may concern:*

Be it known that I, EUGÈNE SCHNEIDER, a citizen of the French Republic, and a resident of 42 Rue d'Anjou, Paris, France, have invented a new and useful Improved Construction of Bogies, which invention is fully set forth in the following specification.

This invention has for its object to provide an improved construction of bogie, which is characterized by the feature that its frame is composed of a girder-like structure of reinforced cement which, in addition to the necessary lodgment for the parts of the socket for the center pin connecting the bogie to the frame of the vehicle, comprises lodgments or recesses in which are fixed molded members that form the supports for the ends of the suspension springs, and that also serve as means of the attachment for the horn-plates of the pedestal, serving to hold the axle-box. The said girder-like structure may also have recesses for the lodgment of analogous molded members that serve for the attachment of the pivots of the brake block suspension links.

Two constructional forms of the improved bogie are illustrated by way of example in the accompanying drawings in which:—

Fig. 1 is a vertical section on the line I—I of Fig. 2.

Fig. 2 is a half plan of the improved bogie partly in section on the line II—II of Fig. 1.

Fig. 3 is an end elevation partly in section on the line III—III of Fig. 2.

Fig. 4 is a partial cross section on the line IV—IV of Fig. 1.

Figure 1:
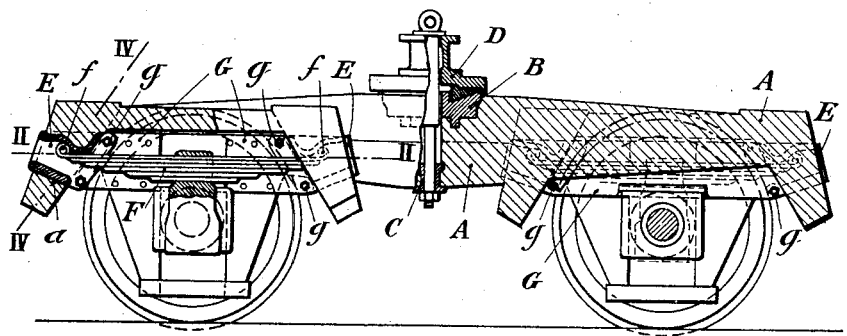
Figures 1 to 4 illustrate the first constructional form.
Figure 2:
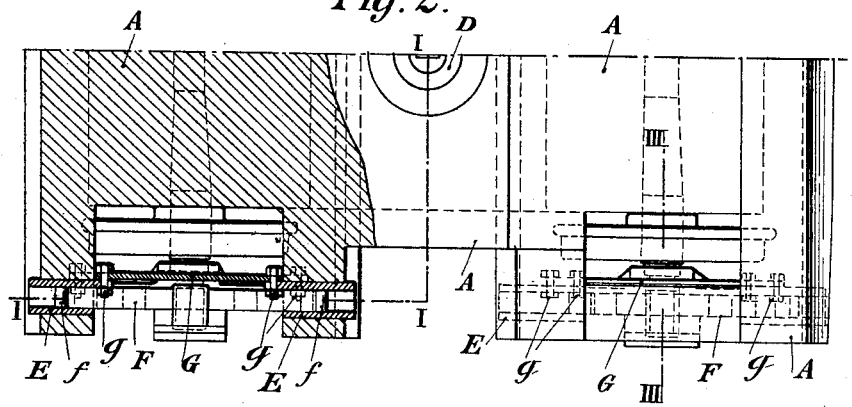
Figure 3:
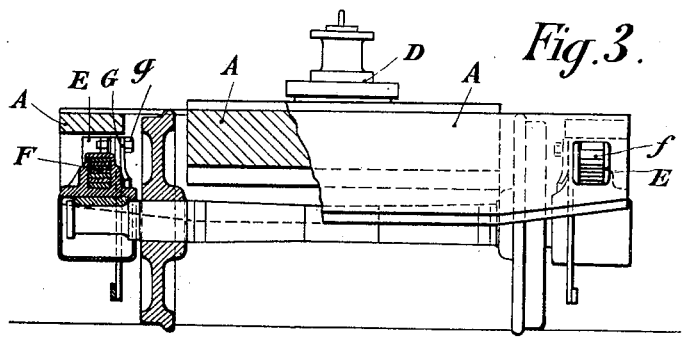
Figure 4:
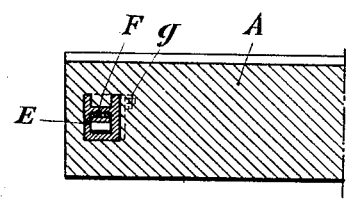
Figure 5:
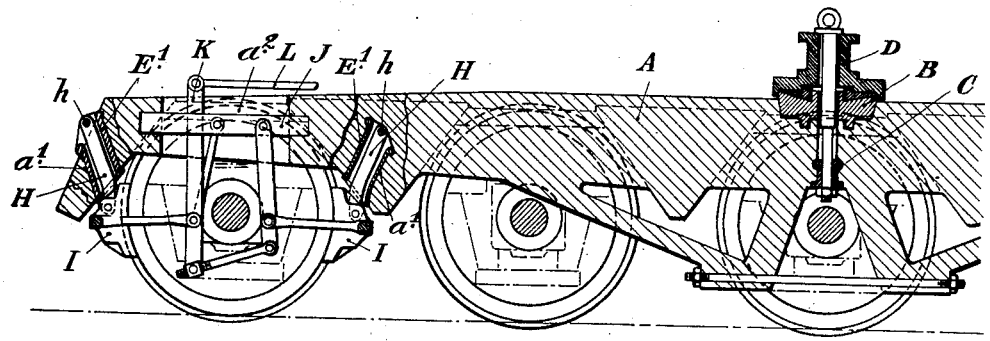
Figure 6:
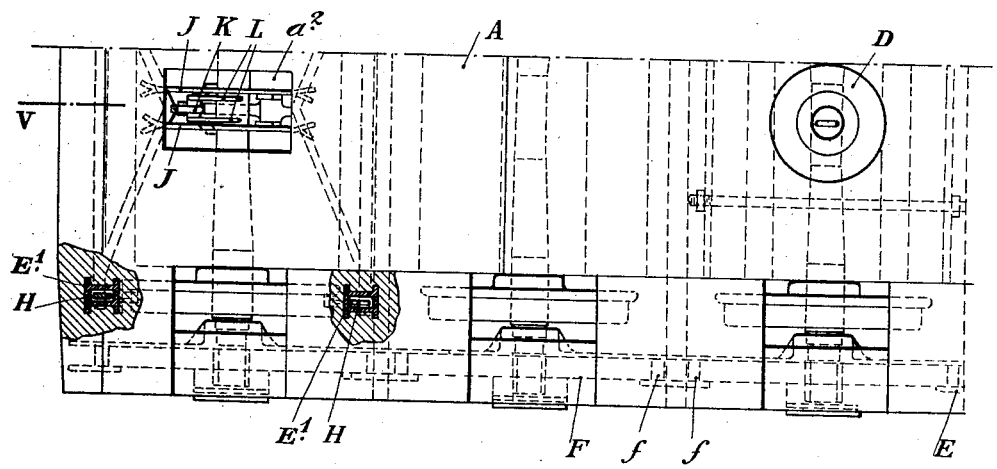

Complementary Figs. 5 and 5$^a$ show a vertical longitudinal sectional view of a second constructional form of the invention embodying a bogie having five wheeled axles, being taken on the line V—V in the view shown by the complementary Figs. 6 and 6$^a$.

Complementary Figs. 6 and 6$^a$ show a plan view of the same, being broken away in parts.

The improved bogie which is shown in this first example, with two axles, is characterized by the feature that its frame consists of a girder-like structure A of reinforced cement comprising in addition to the necessary lodgment for the parts B and C of its pivot pin socket B—C—D, also lodgments or recesses $a$ into which are fixed molded members E that form the supports for the ends $f$ of the suspension springs F, and also serve as means of attachment for the horn-plates G of the axle-box pedestal. The connection between the hornplates G and the molded members E may be effected by means of ordinary bolts $g$.

This improved construction of bogie allows of mounting the reinforced concrete frame A very speedily and simply upon the wheeled axles; it being sufficient for this purpose to engage the ends $f$ of the springs in the molded members E and insert the bolts $g$.

As in the preceding example, the frame of the bogie in the second constructional example, embodying five wheeled-axles in the formation, consists of a girder-like structure A of reinforced concrete, comprising lodgments $a$ for molded members that serve as supports for the ends $f$ of the suspension springs F as well as means of attachment for the hornplates G of the axle-box pedestal.

As shown in Fig. 5$^a$ one and the same molded member E may serve as a support for the ends of the suspension springs of two adjacent axles.

The girder-like structure A (Figs. 5 and 6) comprises recesses $a^1$ for molded members E$^1$ which serve as means of attachment for the pivot pins $h$ supporting the suspension links H of the brake blocks I.

The brake rigging may of course be of any suitable known type. Flat bars J having their ends fixed in the cement of the girder-like structure A, may be set in lodgments $a^2$ to serve as means of attachment for the pivot pins of certain parts of the brake rigging. In the illustrated example, the lever K connected to the rod L for actuating the brake rigging, extends through the lodgments $a^2$.

What I claim is:—

1. In a bogie, a girder-like frame of reinforced concrete, and fastening-devices for attaching bogie-accessories seated in lodgments in the material of said frame.

2. In a bogie, a girder-like frame of reinforced concrete, an axle-box spring, and a fastening-device for attaching each end of the spring seated in a lodgment in the material of said frame.

3. In a bogie, a girder-like frame of reinforced concrete, a pedestal provided with horn-plates, an axle-box in said pedestal guided by said horn-plates, a spring bearing on the axle-box, and fastening devices seated in the material of said frame for attaching the ends of the spring and the horn-plates.

In testimony whereof I have signed this specification.

EUGÈNE SCHNEIDER.